United States Patent [19]

Grochowski et al.

[11] Patent Number: 4,695,444
[45] Date of Patent: Sep. 22, 1987

[54] METHOD OF MANUFACTURING SULPHUR FROM SO₂ CONTAINING GASES

[75] Inventors: Horst Grochowski, Oberhausen; Dieter Zurawsky, Gladbeck; Karl Knoblauch, Essen; Klaus Goldschmidt, Essen; Jürgen Schwarte, Essen, all of Fed. Rep. of Germany

[73] Assignee: Foster Wheeler Energy Corporation, Livingston, N.J.

[21] Appl. No.: 432,398

[22] Filed: Sep. 30, 1982

Related U.S. Application Data

[63] Continuation of Ser. No. 280,506, Jul. 6, 1981, abandoned, which is a continuation of Ser. No. 131,363, Mar. 18, 1980, abandoned.

[30] Foreign Application Priority Data

Aug. 21, 1979 [DE] Fed. Rep. of Germany ....... 2933713

[51] Int. Cl.⁴ ............................................. C01B 17/02
[52] U.S. Cl. .................................... 423/569; 423/570; 423/573 G; 423/574 R
[58] Field of Search ........... 423/563, 569, 570, 573 G, 423/573 R, 574 R, 574

[56] References Cited

U.S. PATENT DOCUMENTS

| Re. 19,531 | 4/1935 | Benner et al. | 423/569 |
| 1,773,294 | 8/1930 | Benner | 423/570 |
| 1,917,685 | 7/1922 | Bacon et al. | 423/569 |
| 1,967,263 | 7/1934 | Rosenstein | 423/569 |
| 4,060,589 | 11/1977 | Hass et al. | 423/569 |

*Primary Examiner*—Gregory A. Heller
*Attorney, Agent, or Firm*—Marvin A. Naigur; Robert D. Bajefsky

[57] ABSTRACT

Sulphur is manufactured out of sulphur dioxide containing gases by dividing the feed gas in two flows of gas having a volume ratio of 2 to 1 and reducing the greater flow of gas on a carbon containing substance like anthracite, thereby obtaining hydrogen sulfide which is mixed with the smaller flow of gas, the mixture being converted in a Claus process to sulphur.

9 Claims, 1 Drawing Figure

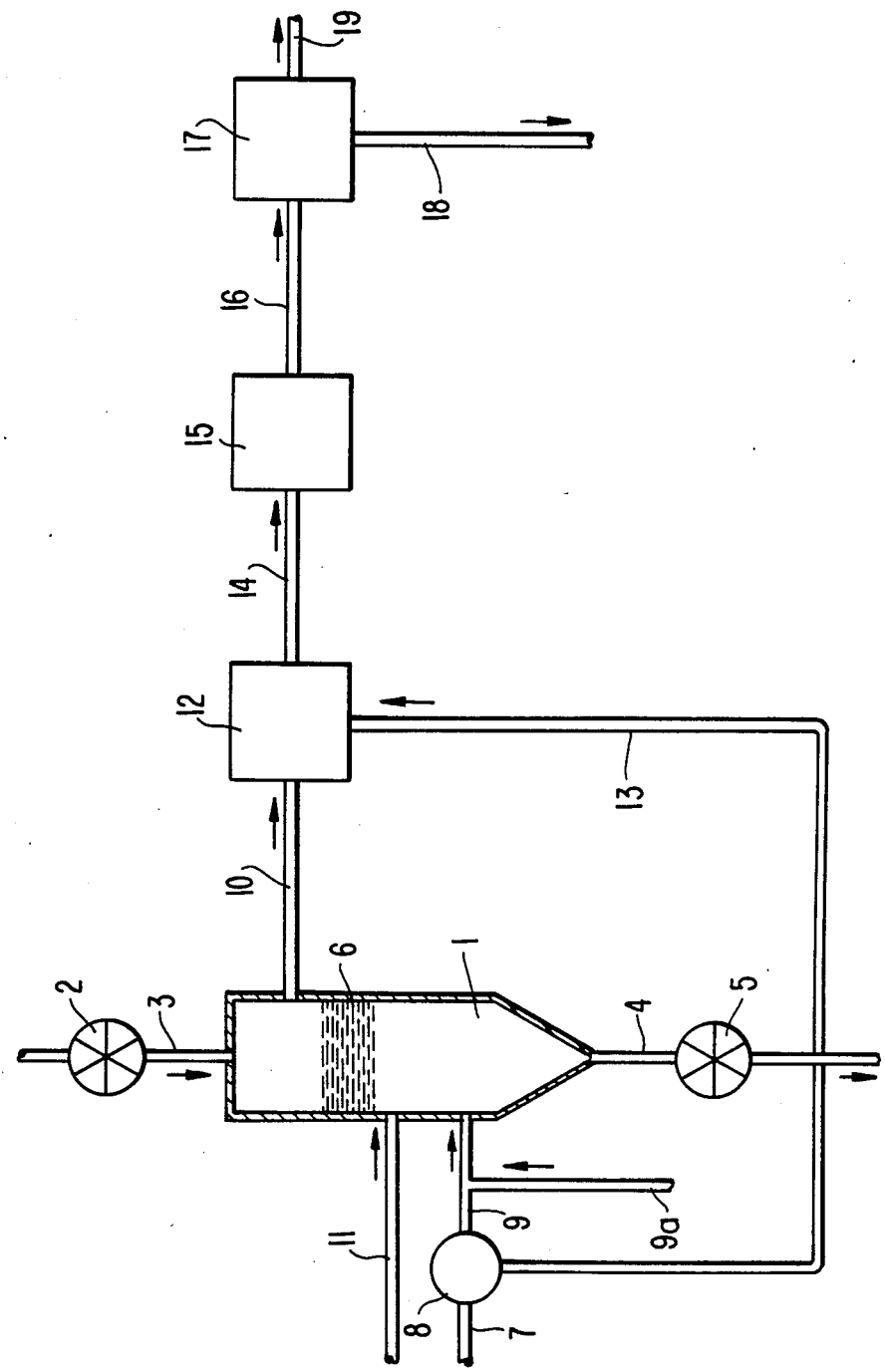

METHOD OF MANUFACTURING SULPHUR FROM SO₂ CONTAINING GASES

This is a continuation of application Ser. No. 280,506, filed July 6, 1981, which in turn is a continuation of application Ser. No. 131,363, filed Mar. 18, 1980, both now abandoned.

BACKGROUND OF THE INVENTION

The invention relates to a method of manufacturing sulphur from $SO_2$ containing gases by reduction treatment of these gases.

In this process, the $SO_2$ containing gases are divided in two flows of gas in a volume ratio of 2:1. The gas flowing in a higher volume is subjected to a reduction on carbon containing substances in a reduction chamber whereby hydrogen sulfide is obtained.

After combining the two volume flows again, this gas mixture is subjected to the so-called Claus process according to the following equation:

$$4H_2S + 2SO_2 = 4H_2O + 3S_2$$

so that the elementary sulphur is obtained in liquid form.

SUMMARY OF THE INVENTION

It has now been found that the described process can be carried out with a practically complete transformation of the sulphur dioxide of the feed gas to sulphur.

This result is obtained by consideration of the following points.

The reduction temperature which is to be chosen in the carbon containing substance depends on the input concentration of the sulphur dioxide in the feed gas as well as on the presence of water vapor and on the chosen carbon containing reducing substance. When the reactivity of the carbon containing substances are very high, like for example, in the case of charcoal, the temperature can be lower than in carbon containing substance having a low reactivity, like for example coke. Anthracite is considered as especially suitable. In any case, the reduction temperature must amount to 900° to 1,000° C.

A feature of the present invention resides in that the adjustment of a reduction zone in the carbon containing substance having the mentioned temperature occurs by injecting measured quantities of air into the carbon containing substance. Yet another feature of the present invention is that an especially hot zone is formed in the carbon containing material above the point of introduction of the air, which zone generally is of a height of 10 to 30 cm. The desired special temperature is, as already mentioned, adjusted by introducing air in measured quantities. The air supply amounts approximately to 1/6 to 1/10 of the volume of the larger flow of gas.

The velocity of flow of the feed gases, suitably guided through the reduction chamber in counterflow from the bottom towards the top relative to the carbon containing substance, is approximately 0.05 to 1 m/sec while the duration in the reduction zone amounts to 0.01 to 0.5 seconds.

For the completeness of the desired course of reaction, the exact adjustment of the reduction temperature in the carbon containing substance is of great importance. Thus, it is proposed to introduce the desired flow of gas into the reduction chamber in an already preheated state, preferably heated up to 350° to 600° C., in order to facilitate the control of temperature. This preheating can be achieved, for example by a heat exchanger or by introducing hot fuel gases directly into the flow of gas which is considered as especially preferable.

The great advantage of this method is the fact that it is possible to transform the sulphur dioxide of the feed gas almost completely to sulphur in a very simple way.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

BRIEF DESCRIPTION OF THE DRAWING

The sole FIGURE shows in diagrammatic form an arrangement for carrying out the method according to the invention.

DETAILS OF THE INVENTION AND OF PREFERRED EMBODIMENT

With reference to the FIGURE there is shown a reduction chamber 1 whose one end which is directed downwardly has a conical shape. The chamber has a diameter of 1.5 m and a total height of 3 m and contains anthracite of a granulation of 3 to 10 mm. Every hour 130 kg of anthracite are filled into the chamber through a sluice 2 arranged above the reduction chamber and connected thereto by a duct 3. Simultaneously, 115 kg/h of anthracite are discharged from the chamber through a duct 4 leading from the point of the cone to a sluice 5. The temperature of the anthracite is increased from approximately 150° C. at the discharge sluice 5 to approximately 950° C. at a reduction zone 6 and is descended to standard temperature from above the reduction zone to the sluice 2. The height of the reduction zone amounts to about 35 cm.

Superposed on the reduction chamber is a gas distributor 8 to which a fluegas is fed through a duct 7. In the gas distributor 8 the flue gas is divided in a volume ratio of 2 to 1 wherein the flow of gas having a higher flow of volume is introduced to the chamber via a duct 9 which is connecting the gas distributor 8 with the chamber 1. In order to preheat this gas flow, hot fuel gases having a temperature of 520° C. are supplied to the duct 9 via a duct 9a associated to the duct 9 between the gas distributor 8 and the chamber 1. This flow of gas streams through the anthracite in counter flow from the bottom towards the top and leaves the reduction chamber via a duct 10 at the upper region of the chamber.

As can be seen from the drawing, air is introduced into the reduction chamber containing the anthracite through a duct 11 which is located above the point of introduction for the larger flow of gas which air also leaves the chamber through the duct 10 after combustion has taken place.

The gases leaving the reduction chamber 1 through the duct 10 are supplied to a mixing chamber 12 connected with the duct 10 the mixing chamber is further connected with the gas distributor 8 via a duct 13 through which the smaller gas flow is supplied. Therefore a gas mixture is formed in the mixing chamber having a temperature of 300°–400° C. This range of temperature is suitable for the performance of the so-called Claus process which is carried out in one or two of the so-called Claus furnaces 15. Each Claus furnace which is filled with the known Claus furnace contact (usually bauxite) is connected with the mixing chamber 12 by a duct 14.

The gas mixture is leaving the one or more Claus furnaces via a duct 16 leading to cooler 17 in which the gas mixture is cooled down to a temperature below 100° C. Sulphur condensing in the cooler is supplied to a storage tank via a duct 18. The exhaust gas containing small amounts of $H_2S$, COS, $CS_2$ leaves the cooler 17 through a duct 19.

The following example will further illustrate the invention.

EXAMPLE

This example illustrates the operation according to the embodiment of the FIGURE.

450 $m^3$/h of flue gas coming from a plant for flue gas desulphurization with a temperature of 220° C. and containing 30% by volume of $SO_2$ (equal to 203 kg sulphur) 15% by volume of $CO_2$ and 55% by volume of $H_2O$ are divided in a flow of gas with 300 $m^3$/h and a flow of gas of 150 $m^3$/h. The flow of gas having a higher flow of volume enters the chamber 1 via the duct 9 after being heated up to 450° C. and is flowing within the reduction chamber 1 in counter flow relative to the anthracite from the bottom towards the top. Simultaneously, 20 $m^3$/h of air are introduced into the chamber 1 via the duct 11. Thus, the reduction zone 6 having a temperature of 920° C. is formed. The gas moving upwardly is cooling down to approximately 400° C. on the anthracite from behind the reduction zone to the outgoing duct 10, through which the gas is supplied to the mixing chamber 12.

In the mixing chamber 12, the larger flow of gas is mixed with the flow of gas coming from the gas distributor 8 via the duct 13 wherein a gas mixture is obtained having a temperature of 340° C. This gas mixture has a volume ratio of $H_2S$ to $SO_2$ of 2 to 1 and is fed to the Claus furnace 15 via the duct 14. The gas leaving the Claus furnace through duct 16 is cooled down in the cooler 17 to a temperature below 130° C. whereby 195 kg of sulphur are flowing down through the duct 18. Thus, 96% of the sulphur compounds contained in the flue gas has been converted into sulphur. The exhaust gas leaving the cooler 17 via duct 19 contains in addition to COS small quantities of $H_2S$ and $SO_2$.

Without further analysis, the foregoing will so fully reveal the gist of the present invention that others can be applying current knowledge readily adapt it for various applications without omitting features that from the standpoint of prior art fairly constitute essential characteristics of the generic or specific aspects of this invention.

What is claimed as new and desired to be protected by Letters Patent is set forth in the appended claims:

1. A method of producing sulfur from sulfur dioxide containing feed gas comprising: dividing said feed gas into first and second streams, the volume ratio of said first stream to said second stream being 2:1; introducing said first stream into a reaction zone containing a carbon containing substance; maintaining a portion of said carbon containing substance at a temperature between 900° C. and 1000° C. by introducing air into said carbon containing substance at a point upstream of the location at which said feed gas is introduced into said carbon containing substance; contacting said feed gas with said portion of said carbon containing substance for a sufficient time to convert the sulfur dioxide to hydrogen sulfide; combining said hydrogen sulfide with said second gas stream thereby producing a gas mixture containing hydrogen sulfide and sulfur dioxide in a volume ratio of 2:1; causing the hydrogen sulfide and the sulfur dioxide in said gas mixture to react and form sulfur.

2. A method as defined in claim 1 wherein said portion is maintained at a temperature of 930° C.

3. A method as defined in claim 1 wherein air is introduced in amounts of approximately 1/6 to 1/10 of the volume of said first stream.

4. A method as defined in claim 1, wherein said first stream flows from the bottom towards the top of said reaction zone and said carbon containing substance flows from the top to the bottom of said zone and wherein the velocity of flow of said first stream is 0.05 to 1 m/sec.

5. A method as defined in claim 4, wherein the duration of the flow of said first stream in said portion is adjusted to 0.01 to 0.5 seconds.

6. A method as defined in claim 1, wherein said first stream is preheated to a temperature of 350° C. to 600° C. by adding hot fuel gases before contacting the carbon containing substance.

7. A method as defined in claim 6, wherein said first stream is preheated to 520° C.

8. A method as defined in claim 5, wherein the carbon containing substance is charcoal or coke.

9. A method as defined in claim 6, wherein the carbon containing substance is anthracite.

* * * * *